(12) United States Patent
Galehr (10) Patent No.: US 12,179,866 B2
(45) Date of Patent: Dec. 31, 2024

(54) STEERING COLUMN FOR A MOTOR VEHICLE

(71) Applicants: thyssenkrupp Presta AG, Eschen (LI); thyssenkrupp AG, Essen (DE)

(72) Inventor: Robert Galehr, Schaanwald (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 826 days.

(21) Appl. No.: 17/268,648

(22) PCT Filed: Aug. 23, 2019

(86) PCT No.: PCT/EP2019/072588
§ 371 (c)(1),
(2) Date: Feb. 16, 2021

(87) PCT Pub. No.: WO2020/043615
PCT Pub. Date: Mar. 5, 2020

(65) Prior Publication Data
US 2021/0188352 A1    Jun. 24, 2021

(30) Foreign Application Priority Data
Aug. 27, 2018 (DE) ...................... 10 2018 120 898.7

(51) Int. Cl.
*B62D 7/22* (2006.01)
*B62D 1/20* (2006.01)

(52) U.S. Cl.
CPC ............... *B62D 7/224* (2013.01); *B62D 1/20* (2013.01)

(58) Field of Classification Search
CPC ......... B62D 7/224; B62D 1/20; B62D 5/0472
See application file for complete search history.

(56) References Cited

U.S. PATENT DOCUMENTS 4,352,304 A    10/1982  Warner
4,503,952 A     3/1985  Hesse
(Continued)

FOREIGN PATENT DOCUMENTS

CN    1367326 A    9/2002
DE   31 23 344 A   12/1982
(Continued)

OTHER PUBLICATIONS

International Search Report issued in PCT/EP2019/072588, dated Nov. 13, 2019.

*Primary Examiner* — Tony H Winner
(74) *Attorney, Agent, or Firm* — thyssenkrupp North America, LLC (57) ABSTRACT

A steering column for a motor vehicle having a steering shaft mounted in a steering column tube so as to be rotatable about a longitudinal axis and a damping device. The damping device has an element which is stationary in relation to the steering column tube and a rotatable element which is coupled in terms of rotation to the steering shaft. The rotatable element is rotatable relative to the stationary element about an axis of rotation. A damping fluid is arranged between the rotatable and the stationary element. The steering column thus permits operationally reliable damping of the steering shaft in a steering system. At least two surfaces of the rotatable element are provided, which are parallel to the axis of rotation, are in contact with the damping fluid, and are arranged so as to be spaced apart coaxially from one another.

8 Claims, 7 Drawing Sheets

(56) References Cited

U.S. PATENT DOCUMENTS

| | | | |
|---|---|---|---|
| 5,301,775 A | 4/1994 | Nedbal | |
| 6,041,899 A | 3/2000 | Takamatsu | |
| 9,937,952 B2* | 4/2018 | Schnug | B62D 7/22 |
| 10,239,556 B2* | 3/2019 | Bossio | F16F 15/005 |
| 2001/0054527 A1* | 12/2001 | Card | F16F 9/535 |
| | | | 267/140.14 |
| 2002/0101014 A1 | 8/2002 | Kurihara et al. | |
| 2007/0085291 A1* | 4/2007 | Lee | F16F 9/145 |
| | | | 280/90 |
| 2009/0266658 A1* | 10/2009 | Lueker, Jr. | B62D 7/228 |
| | | | 188/267.1 |
| 2015/0057889 A1* | 2/2015 | Tamaizumi | B62D 5/0463 |
| | | | 701/41 |
| 2016/0347360 A1* | 12/2016 | Schnug | B62D 1/16 |
| 2016/0357093 A1 | 12/2016 | Jaumann | |

FOREIGN PATENT DOCUMENTS

| | | |
|---|---|---|
| DE | 295 18 045 U | 1/1996 |
| DE | 10 2008 011 859 A | 10/2009 |
| DE | 10 2010 049 928 A | 5/2011 |
| DE | 10 2015 210 528 A | 12/2016 |
| JP | 2004-322808 A | 11/2004 |
| JP | 2005-324774 A | 11/2005 |
| JP | 2011-231868 A | 11/2011 |
| WO | 2016198328 A | 12/2016 |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2019/072588, filed Aug. 23, 2019, which claims priority to German Patent Application No. DE 10 2018 120 898.7, filed Aug. 27, 2018, the entire contents of both of which are incorporated herein by reference.

FIELD

The present disclosure generally relates to a steering column for a motor vehicle.

BACKGROUND

Such arrangements are known particularly in the case of a steer-by-wire steering system. In what are referred to as steer-by-wire steering systems, the wheels are not steered by the mechanical coupling thereof to the steering shaft and of the steering wheel connected to the latter. Instead, the steering lock of the steering wheel and the steering speed are determined by sensors and transmitted by a corresponding electrical signal to a steering actuator which triggers the steering of the wheels. As a result, although a vehicle still continues to be controllable manually, the vehicle driver no longer has a realistic steering and driving sensation because of the lack of mechanical steering resistance, in particular depending on steering angle and steering speed. In order to obtain a corresponding steering sensation for the vehicle driver and therefore to make the vehicle driver's control safer, it is known from the prior art to damp the steering movement via a damping device coupled to the steering shaft. A steering resistance corresponding to the current steering conditions is thus produced.

DE 10 2008 011 859 A1 discloses a damping apparatus in which an electric motor is coupled to a steering shaft. The electric motor is used here in the generator mode and has a resistance which can be regulated via a bridge circuit. A damping torque can thus be set by the selection of the bridge circuit or by the rotational speed of the electric motor.

Disadvantages of this solution include the comparatively complicated design and the associated poorer operational reliability.

Thus, a need exists for a damping system which permits operationally reliable damping of a steering shaft in a steering system with a simple design.

In some examples, a steering column for a motor vehicle, having a steering shaft, is mounted in a steering column tube so as to be rotatable about a longitudinal axis, and a damping device, wherein the latter has an element which is stationary in relation to the steering column tube, and a rotatable element which is coupled in terms of rotation to the steering shaft, wherein the rotatable element is rotatable in relation to the stationary element about an axis of rotation, and wherein a damping fluid is arranged between the rotatable and the stationary element. According to the invention, at least two parallel surfaces of the rotatable element are provided with respect to the axis of rotation, which surfaces make contact with the damping fluid and are arranged so as to be spaced apart coaxially from one another.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a steering column for a motor vehicle, having a steering shaft, which is mounted in a steering column tube so as to be rotatable about a longitudinal axis, and a damping device, wherein the latter has an element which is stationary in relation to the steering column tube, and a rotatable element which is coupled in terms of rotation to the steering shaft, wherein the rotatable element is rotatable in relation to the stationary element about an axis of rotation, and wherein a damping fluid is arranged between the rotatable and the stationary element.

A steering column with viscous damping produced with a damping device according to the invention is perceived here by the driver as being pleasant and at the same time is low-wearing and low-maintenance. The damping takes place here by means of a force which is directed counter to the rotation and is caused by a shear stress of the damping fluid. The damping force is proportional to the shear stress, which, in turn, is proportional or overproportional (squared) to the speed of movement of a surface in contact with the damping fluid. The damping is therefore proportional or overproportional (squared) with respect to the speed of rotation of the steering shaft. This means that, in the case of rapid steering movements, the rotation damper according to the invention has a greater damping effect than in the case of slow steering speeds, and this corresponds to the real reaction of the wheels on account of the inertia thereof and thus brings about a steering sensation closer to reality. In addition, the damping is fed back directly to the steering shaft and the steering wheel. The design of the surfaces of the rotatable element, which surfaces are in contact with the damping fluid and are parallel to the axis of rotation, permits transmission of a speed of rotation, which is increased in comparison to other embodiments, to the damping fluid, thus resulting in improved damping with a comparable use of space. The parallel surfaces are parallel to one another in the circumferential direction; said surfaces are thus preferably spaced apart constantly from one another, with at least the one surface at least partially surrounding the other surface. The parallel arrangement of the surfaces, which are in contact with the damping fluid, to the axis of rotation is also understood as meaning a deviation of up to ±10° with respect to an ideal parallel arrangement. It can thus also be stated that the surfaces of the rotatable element are at an angle to the axis of rotation, wherein the angle is smaller than or equal to 10°. The surfaces in this respect can thus be configured at an angle to the axis of rotation without departing from the scope of the invention. Such an angular arrangement can be required in order, for example, to be able to provide removal tapers and thus to be able to remove the rotatable element safely from a tool.

In an advantageous development, the axis of rotation of the rotatable element is arranged parallel to the longitudinal axis of the steering shaft. The axis of rotation can preferably be at a distance greater than zero from the longitudinal axis, and therefore the axis of rotation is arranged genuinely parallel to the longitudinal axis. Alternatively, the distance between the axis of rotation and the longitudinal axis can be zero, and therefore said axes are parallel to each other and coincide. In other words, the axis of rotation and the longitudinal axis coincide; said axes are thus coaxial with respect to each other.

In a preferred embodiment, the rotatable element has two or more hollow cylinder elements which are arranged concentrically and are spaced apart from one another. The damping of the damping fluid is likewise proportional to a surface on which said damping is effective. By means of the hollow-cylinder-like design of the rotatable element, a damping surface, which corresponds to the respective cylinder lateral surface, of the damping fluid is advantageously increased—the cylinder lateral surface is significantly larger, with a sufficient longitudinal extent, than a corresponding cylinder base surface. The shear stress is likewise increased since the circumferential speeds, which are averaged over the respective cylinder lateral surfaces, are significantly greater at the same speed of rotation than circumferential speeds correspondingly averaged over the cylinder base surface. A damping effect is thus significantly improved overall.

In a development of the invention, it is provided that also the stationary element has two or more hollow cylinder elements which are arranged concentrically and are spaced apart from one another, wherein the respective hollow cylinder elements have diameters permitting a meshing movement of the respective hollow cylinder elements with one another. The damping fluid is thus very advantageously arranged in likewise hollow-cylindrical intermediate spaces between the meshing elements. This permits particularly effective damping since shearing of the damping fluid can in each case take place on both longitudinal sides of an intermediate space, said longitudinal sides being parallel to the axis of rotation. A first shearing action takes place relative to the rotating element and a second relative to the stationary element, wherein both shearing actions are effective in opposite directions since the rotatable element moves relative to the stationary element.

Furthermore, it is provided that all of the hollow cylinder elements of the stationary element and all of the hollow cylinder elements of the rotatable element are configured so as to be connected to one another in each case at an axial end, in particular in each case by means of an annular disk which in each case has a central passage opening for the steering shaft. This permits effective sealing of the damping fluid and a uniform rotational movement of the rotating element about an axis.

In a refinement of the invention, it is likewise provided that the rotatable and the stationary elements have an identical effective axial length, which permits effective use of space and corresponding manufacturing of the elements, and also facilitates the sealing.

According to a further embodiment of the invention, lengths of an innermost surface of the rotatable element and of an outermost surface of the stationary element, which lengths are parallel to the axis of rotation, correspond, as a result of which axial ends of the rotation damper according to the invention are configured to be annular, and the sealing of the damping fluid is facilitated.

It is also according to the invention that a distance between the hollow cylinder elements from the stationary element to the rotatable element perpendicular to their longitudinal axis is unequal, in particular is smaller than a distance between a free axial end of a hollow cylinder element and the annular disk which is in each case axially opposite said end. This achieves a certain buffer action of the movement of the damping fluid, which is advantageous, for example, in the event of rapid steering movements and changes in direction and also with respect to a possible heating of the damping fluid.

In a further embodiment, the rotatable element and the stationary element are configured in a manner surrounding the steering shaft, which in turn means a saving on space. In this embodiment, the steering shaft and the rotatable element are very advantageously coupled directly to one another.

It is also provided that the axis of rotation of the rotatable element coincides with the steering shaft axis, which in turn permits a direct coupling of the two rotational movements.

According to the invention, it is also provided that the damping fluid is silicone oil. Damping, which is scarcely affected by frictional heat, which occurs, is thus achieved because of the viscosity, which is substantially independent of temperature in the relevant region. Furthermore, silicone oil has the advantage of being non-toxic.

It is likewise according to the invention that a gearing is arranged between the steering shaft and the rotatable element. The gearing is preferably configured as a toothed gearing, bevel gearing, friction gearing or wrap-around gearing, particularly preferably as a belt gearing, for example a toothed belt gearing. A construction clearance is thereby advantageously increased. Furthermore, the amplitude of the rotation can be changed and direct coupling between rotation damper and steering shaft is prevented. The transmission ratio of the gearing is preferably selected in such a manner that the rotation of the steering shaft is geared up, and therefore the rotatable element rotates more than one full revolution during one full revolution of the steering shaft. The transmission ratio is preferably smaller than 0.8, particularly preferably smaller than 0.5. Such a transmission makes it possible to further improve the damping behavior.

The steering column tube is preferably connectable directly or indirectly to the motor vehicle.

The steering column tube is preferably accommodated displaceably in an outer steering column tube, wherein the outer steering column tube is supported by a bracket which is connectable to the vehicle. The steering column tube is preferably adjustable relative to the bracket. In one embodiment, this adjustment can take place manually. In an alternative variant embodiment, the adjustment takes place by means of at least one motorized adjustment drive.

Figure 1:
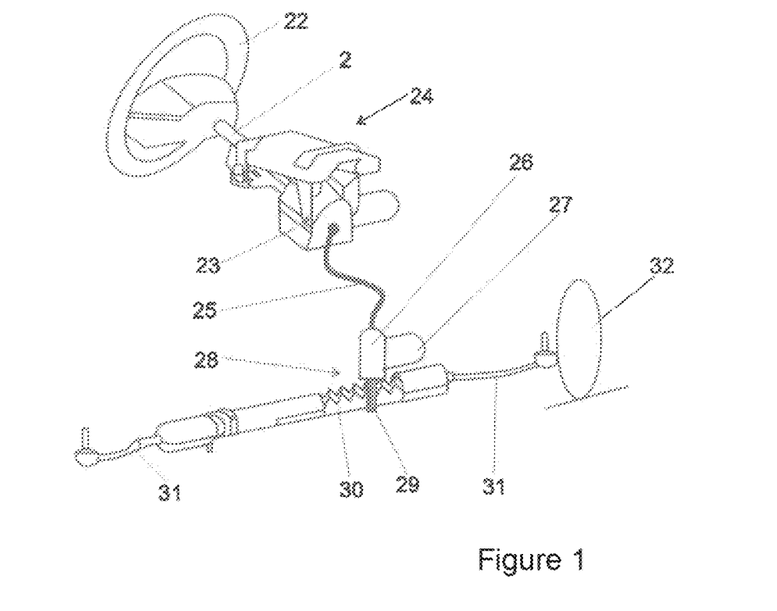
FIG. 1 is a schematic view of a steer-by-wire steering system.

FIG. 1 shows a schematic illustration of a steer-by-wire steering system. The latter comprises an input unit 24 which is connected via an electric line 25 to an electric steering drive 26. The input unit 24 has a feedback actuator 23, with a steering shaft 2, to the rear end of which with respect to the direction of travel a steering handle 22 configured as a steering wheel is attached. The feedback actuator 23 serves for feeding in a feedback torque by a steering actuator which acts on the steering shaft 2. A corresponding feedback signal is generated according to the driving properties, such as carriageway composition, steering wheel lock or driving speed, with the intention being to generate a realistic driving sensation for a driver.

The steering drive 26 comprises a servomotor 27, which introduces a steering actuating torque into a steering gearing 28. The steering actuating torque is converted there via a pinion 29 and a rack 30 into a translational movement of tie rods 31, thus bringing about a steering lock of the steered wheels 32.

Figure 2:
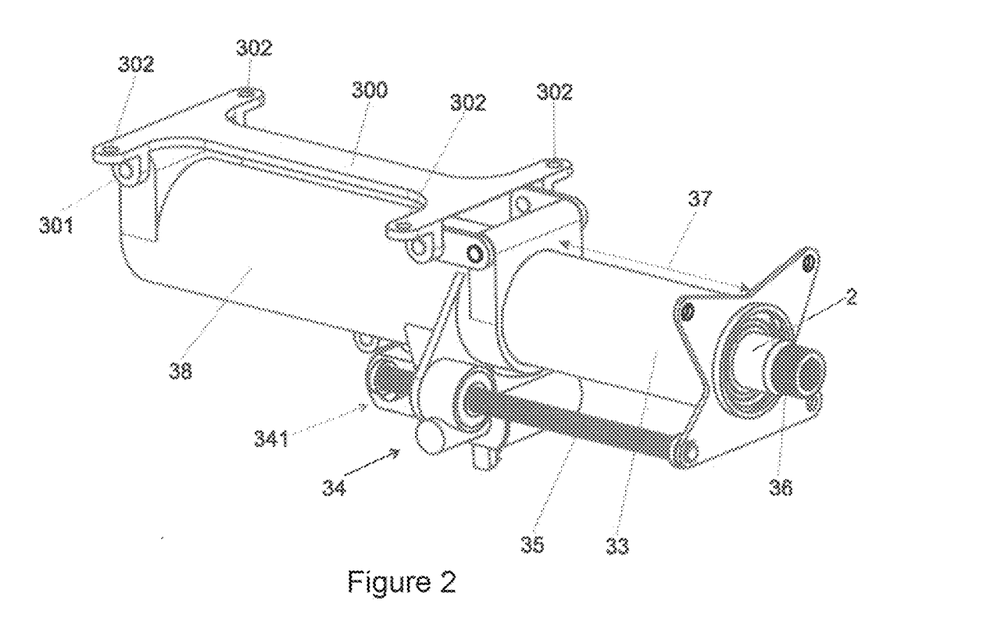
FIG. 2 is a perspective view of an electrically adjustable steering column.

FIG. 2 shows an electrically adjustable steering column. Within a steering column tube 33, which is partially arranged in an outer steering column tube 38 and which may also be referred to as the inner steering column tube 33, a steering shaft 2 is mounted rotatably, the steering shaft being connectable in the direction of the illustrated steering shaft end 36 to a steering wheel 22, not illustrated, and therefore a steering or rotational movement can be introduced as a steering torque into the steering shaft 2 with the aid of the steering wheel 22. A distance from a driver's seat opposite the steering wheel 22 is adjustable via a change in an effective steering column tube length 37 by inserting the steering column tube 33 into, or moving it out of the outer steering column tube 38. For this purpose, an electric adjustment drive 34, which is connected to the outer guide 38, is configured so as to be movable along a threaded rod 35. Furthermore, the outer steering column tube 38 is held pivotably on a supporting unit 300, wherein the outer steering column tube 38 together with the steering column tube 33 and the steering shaft 2 is pivotable in relation to the supporting unit 300 about a pivot axis 301. The pivoting takes place by means of a further electric adjustment drive 341. The supporting unit 300 comprises fastening structures 302 for coupling the supporting unit to the motor vehicle, not illustrated. The supporting unit 300 may also be referred to as a bracket.

Figure 3:
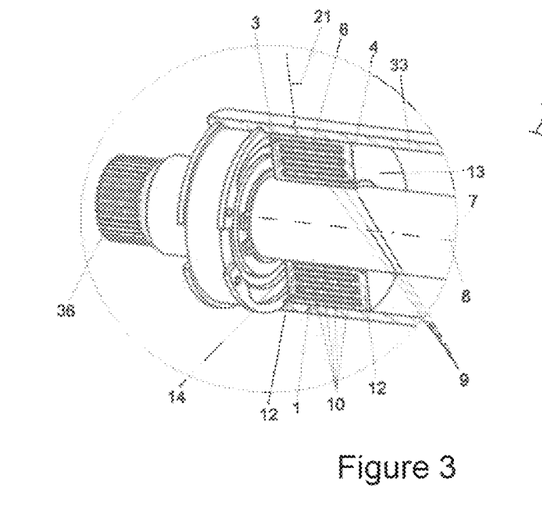
FIG. 3 is a detailed view, which is partially illustrated in cross section, of the steering column, which is shown in FIG. 2, with a damping device.

FIG. 3 shows a detail, illustrated partially in cross section, of the steering column, as is illustrated in FIG. 2, having a damping device 1, which may also be referred to as a rotation damper. The rotation damper has a rotatable element 3 and a stationary element 4, wherein, in the embodiment illustrated, the rotatable element 3 surrounds the steering shaft 2 and is connected to the latter for rotation therewith. This connection between the rotatable element 3 and the steering shaft 2 can take place with a force fit and/or form fit and/or in a manner bonded substance-to-substance. Rotation of the steering shaft 2 thus brings about rotation of the rotatable element 3. In this embodiment, the stationary element 4 is connected to the steering column tube 33 and is coupled thereto in a torque-locking manner such that the stationary element 4 is held non-rotatably in the steering column tube 33. This connection between the stationary element 4 and the steering column tube 33 can also take place with a force fit and/or form fit and/or in a manner bonded substance-to-substance. In the embodiment illustrated, the rotatable element 3 and the stationary element 4 are configured so as to mesh in one another, with said elements being at a distance from one another. A damping fluid 6 is provided between respective opposite surfaces of the two elements 3, 4. Rotation of the rotatable element 3 causes, via shearing action, a rotational movement of the respectively adjacent fluid layers of the damping fluid 6. The relative movement of those layers of the damping fluid 6 which are adjacent to the stationary element 4 causes a further shearing action directed counter to the first shearing force. Both shearing actions bring about a force which is directed counter to the rotation of the rotating element 3, this being synonymous with damping. By the coupling of steering shaft 2 and rotatable element 3, said damping likewise damps the rotation of the steering shaft 2 about a steering shaft axis 8, and therefore a driver also feels a corresponding counterforce at a steering wheel 22 coupled to the steering shaft 2. Surfaces 20 of the rotatable element 3, which surfaces are parallel to the axis of rotation 7 and are in contact with the damping fluid 6, are arranged in such a manner that they are opposite one another along a surface normal 21. According to the invention, at least two parallel surfaces 20 of the rotatable element 3, which surfaces make contact with the damping fluid 6 and are arranged spaced apart coaxially from one another, are provided with respect to the axis of rotation 7. The damping fluid 6 is thus guided between coaxial cylindrical rotation surfaces. In the embodiment shown, the stationary and the rotatable element 3, 4 are in each case constructed from coaxial hollow cylinder elements 10, 9, and therefore the surfaces 20 of the rotatable element 3, which surfaces are parallel to the axis of rotation 7 and are in contact with the damping fluid 6, correspond to the lateral surfaces of the hollow cylinder elements 9. The hollow cylinder elements 9 of the rotatable element 3 are in each case configured so as to be connected at an axial end 12 by means of an annular disk 14. Similarly, the hollow cylinder elements 10 of the stationary element are in each case configured so as to be connected at an axial end 12 by means of a further annular disk 13. By means of the equivalent axial length 17 of the hollow cylinder elements 9, 10, the stationary element 4 and the rotatable element 3 are constructed in a mirror-inverted manner except for a radial offset. The hollow cylinder elements 9, 10 of the stationary element 4 and of the rotatable element 3 are arranged in a manner alternating radially outward from the axis of rotation 7.

Figure 4:
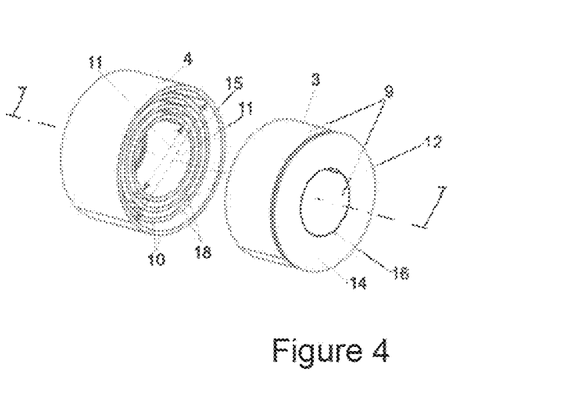
FIG. 4 is a detailed view of the elements of the damping device.

FIG. 4 shows an illustration of elements of the damping device according to the embodiment illustrated in FIG. 3, wherein the rotatable element 3 and the stationary element 4 are pulled apart. The equivalent design of the rotatable element 3 and stationary element 4 from coaxial hollow cylinder elements 9, 10 can readily be seen. The diameters 11 of the hollow cylinder elements 9, 10 in the operationally ready state of the rotation damper, i.e. when the rotatable and the stationary element 3, 4 according to FIG. 3 are joined together according to the invention, permit a meshing movement of the respective hollow cylinder elements 9, 10. According to the invention, the diameter 11 of an innermost hollow cylinder 9 of the rotatable element 3 is smaller than the diameter 11 of an innermost hollow cylinder 10 of the stationary element 4. The stationary and the rotatable element 4,3 in each case have a passage opening 15, 16 for the passage of the steering shaft 2, or, in the case of the embodiment of the axis of rotation 7 parallel to the longitudinal axis 8 of the steering shaft 2, for the passage of an axis of rotation 45. The diameter 11 of an outermost hollow cylinder element 10 of the stationary element 4 is similarly larger than the diameter 11 of an outermost hollow cylinder element 9 of the rotatable element 3. The hollow cylinder elements 10, 9 each have an axial end 12 connected to an annular disk 13, 14, and a free axial end 18 opposite said axial end 12. In the operationally ready state of the rotation damper according to the invention, the damping fluid is thus guided between the lateral surfaces of the hollow cylinder elements 9, 10 and between in each case free axial ends 18 and opposite annular disk 14, 13.

Figure 5:
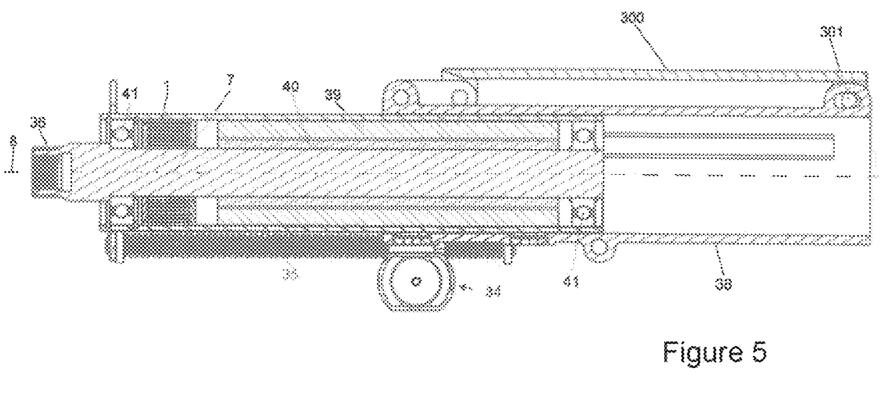
FIG. 5 is a cross section of the steering column according to FIG. 2.

FIG. 5 shows a cross section of a steering column according to FIG. 2 with a damping device 1 and an active feedback actuator. The rotatable arrangement of the steering shaft 2 via the bearings 41, configured as rolling bearings, in the steering column tube 33 can be seen. The electric adjustment mechanism is likewise illustrated, by means of the adjustment drive 34 and threaded rod 35, said adjustment mechanism moving the steering column tube 33 axially in the outer guide. The steering column illustrated furthermore has a rotor 40, which is connected to the steering shaft 2, and a stator 39, which is opposite said rotor and is connected to the steering column tube 33. Said stator 39 and rotor 40 interact as an electric motor, wherein they are part of the active feedback actuator, with the latter being configured so as to introduce a torque into the steering shaft 2. A damping torque which is generated in a manner corresponding to the driving properties and the friction of the wheels can be coupled between rotor and stator via the opposed movement thereof relative to each other and via correspondingly occurring frictional forces, and therefore here an active feedback actuator acts as an electric motor.

Figure 6:
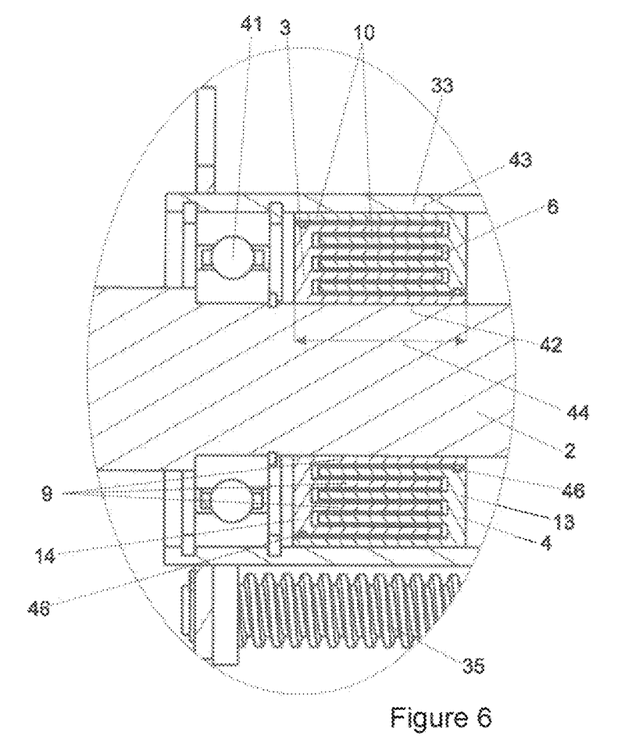
FIG. 6 is a detailed view of the cross section of the steering column according to FIG. 5 in the region of the damping device.

FIG. 6 shows the cross section of the installed rotation damper according to the invention according to FIG. 3 and FIG. 5. In the embodiment shown of the invention, a length 44, parallel to the axis of rotation 7, of an innermost surface 42 of the rotatable element 3, which surface is connected to the steering shaft 2, is the same size as a length 44, parallel to the axis of rotation 7, of an outermost surface 43 of the stationary element 4, which surface is connected to the steering column tube 33. This permits an overall annular, compact design of the rotation damper according to the invention, thus permitting a particularly stable rotation. In the embodiment shown, the damping fluid 6 including seals 46 configured as a cord ring seal (O-ring) are provided between an innermost hollow cylinder 9 and annular disk 13 and between an outermost hollow cylinder 10 and annular disk 14. Alternatively, other sealing arrangements, for example radial shaft sealing rings, can be used as the seal.

Figure 7:
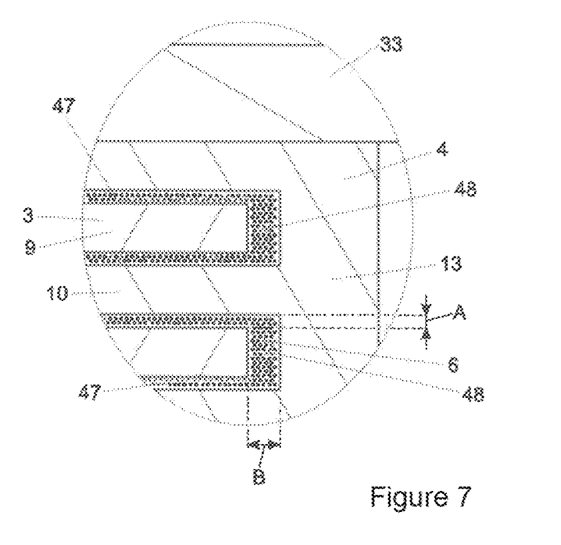
FIG. 7 is a detailed view of a rotation damper according to FIG. 6.

FIG. 7 shows an enlarged detail of a rotation damper according to the invention, as illustrated in FIG. 6. In the embodiment according to the invention that is illustrated, it can readily be seen that a distance A between the hollow cylinder elements 9, 10 of the rotatable and the stationary element 3, 4 is smaller than a distance B between a free axial end 18 of a hollow cylinder element 9 and of the annular disk 13 opposite the latter. In the corresponding intermediate space 47, which is parallel to the axis of rotation 7 and has the width A and the length corresponding to the axial length of the hollow cylinder element 9, the damping fluid 6 is guided parallel to the axis of rotation 7. The smaller A, the greater is the shearing action, averaged over A, on the damping fluid 6. The damping fluid 6 is likewise guided in a further intermediate space 48 with the width corresponding to a distance between two hollow cylinder elements 10 and with a length corresponding to the distance B. Since, in the advantageous embodiment illustrated, B is significantly larger than A, the shearing action, which is averaged over B, on the damping fluid 6, ignoring the precise relative speed of rotation of those surfaces of the rotatable or stationary element 3, 4 which are in each case in contact with the damping fluid 6, is significantly smaller than A. The effect thus achieved is that the damping fluid 6 in the intermediate spaces 48 with the length B has a type of buffer effect with respect to the more rapidly moving and more greatly sheared damping fluid 6 in the intermediate spaces 47 of the width A.

The value of the width A is preferably less than 75% of the value of the length B. The value of the width A is particularly preferably less than 50% of the value of the length B.

Figure 8:
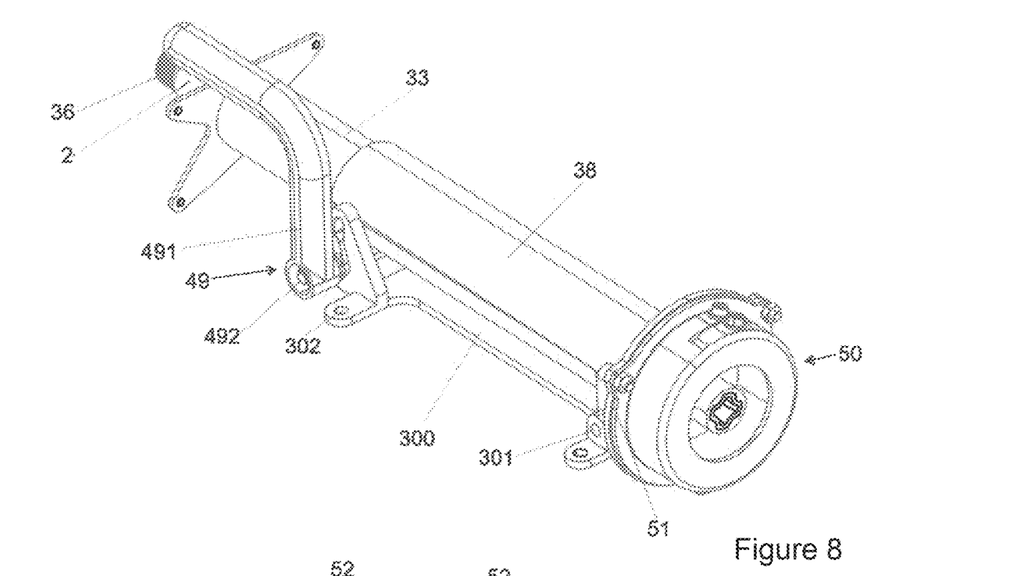
FIG. 8 is a perspective view of a steering column in a second aspect with a passive feedback actuator.

FIG. 8 shows a manually adjustable steering column with a passive feedback actuator 50. A rotation damper according to the invention, not visible here, is arranged in a steering column tube 33. The steering column tube 33 is arranged displaceably within an outer steering column tube 38, analogously to the steering column, which is illustrated in FIG. 2. However, in the case of the steering column illustrated, displacement of the steering column tube 33 cannot be carried out electrically, but rather manually. For this purpose, the steering column comprises a fixing device 49. The fixing device 49 can be switched over by means of a lever 491 between a release position and a fixing position, wherein the steering column tube 33 in the release position is adjustable relative to the support unit 300, wherein the steering column tube 33 is telescopic in relation to the outer steering column tube 38 and/or the steering column tube 33 together with the outer steering column tube 38 is pivotable relative to the supporting unit 300 about a pivot axis 301. In the fixing position, the steering column tube 33 is secured in relation to the outer steering column tube 38 and the supporting unit 300.

The lever 491 is coupled in terms of action to a clamping axis 492, wherein furthermore a cam disk, which is coupled in a torque-locking manner to the lever 491, interacts with a slotted disk such that, when the lever 491 is rotated, the cam disk is rotated in relation to the slotted disk, thus providing a stroke leading to clamping in the fixing position. A passive feedback actuator 50, which is coupled to the steering shaft 2, is arranged at an end 51 of the outer guide 38 that is opposite the steering-wheel-side steering shaft end 36. Said feedback actuator produces a reaction torque which is directed counter to a steering torque introduced by a steering wheel 22, which is not illustrated here and which is likewise coupled to the steering shaft 2.

Figure 9:
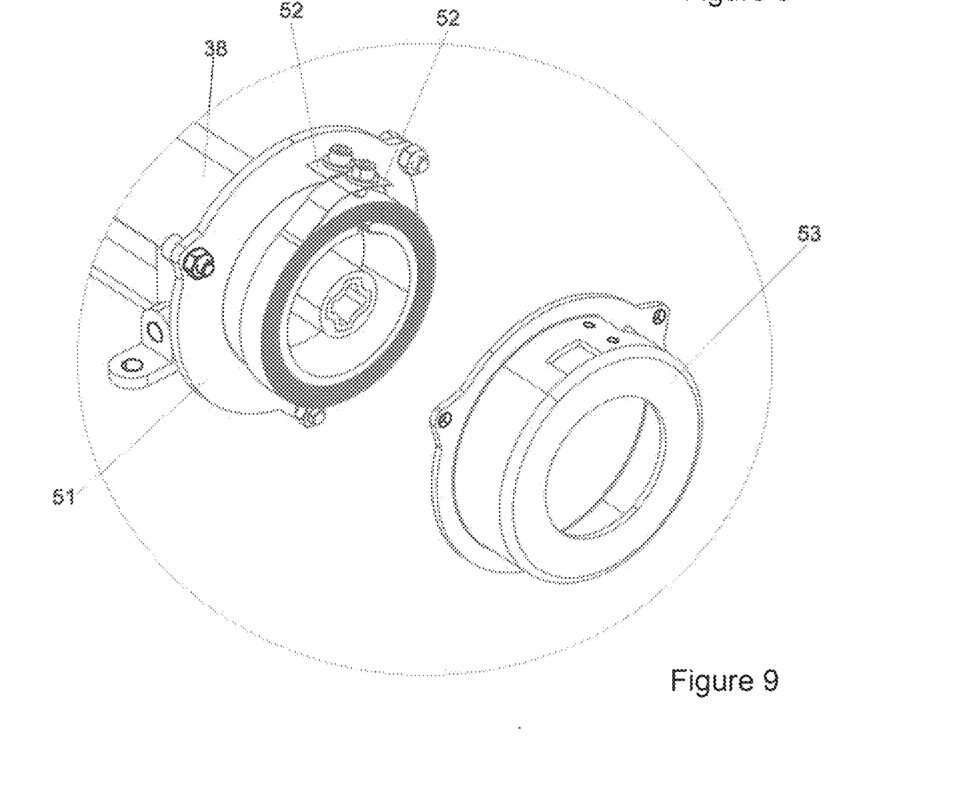
FIG. 9 is a partially exploded view of a passive feedback actuator from FIG. 8.

FIG. 9 shows a detail from FIG. 8, which shows the passive feedback actuator 50 in a partially exploded illustration. Said feedback actuator has oppositely arranged flat spiral springs 52, which surround the outer steering column tube 38 and apply a resetting force when the steering wheel 22 is rotated and thus when the steering shaft 2 is rotated. A protective cap 53 can be placed onto the end 51 of the outer steering column tube 38, and said protective cap, when placed on, surrounds the flat spiral springs 52 and protects the latter against soiling or against external stress.

Figure 10:
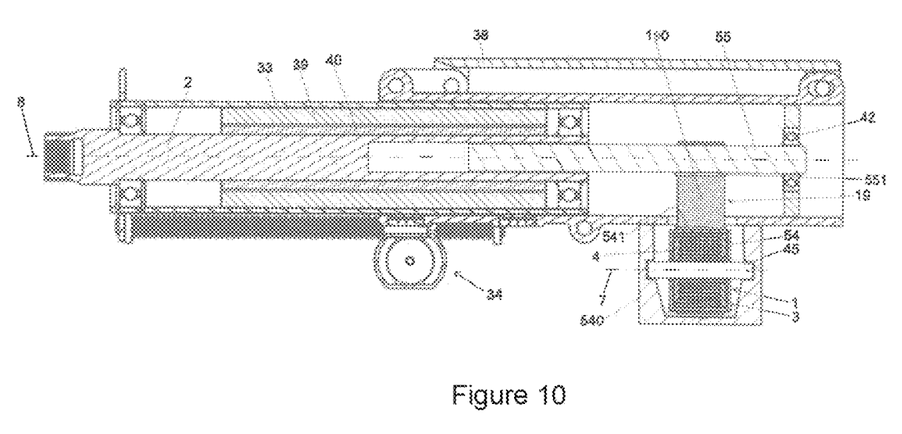
FIG. 10 is a cross section of a steering column in a third variant embodiment, wherein the damping device is coupled to the steering shaft with the interconnection of a gearing.

FIG. 10 shows an electrically adjustable steering column similar to the one illustrated in FIG. 5. However, a rotation damper 1 is arranged here in a housing 54 outside the steering column tube 33 and outside the outer steering column tube 38 and is held in a bearing portion 540 of the outer steering column tube 38. The rotatable element and the stationary element 3, 4 are arranged about an axis of rotation 45. The axis of rotation 45 and thus also the axis of rotation 7 of the rotatable element 3 is parallel to the longitudinal axis 8 of the steering shaft 2, wherein the axis of rotation 7 is at a distance greater than zero from the longitudinal axis 8. The stationary element 4 is coupled to the axis of rotation 45 in a torque-locking manner, wherein the axis of rotation 45 is non-rotatable in relation to the bearing portion 540. A transmission shaft 55 is mounted rotatably within the outer steering column tube 38 in a manner connected to the steering shaft 2 for rotation therewith. The steering shaft 2 is axially movable here via the adjustment drive 34 with respect to the transmission shaft 55 which is partially guided in said steering shaft. A gearing 19, here a wrap-around gearing, which is preferably a belt gearing and particularly preferably a toothed belt gearing, is arranged on the transmission shaft 55. The transmission shaft 55 has a toothed belt pulley 551. The housing 54 has a further toothed belt pulley 541 on its outer circumference. The toothed belt pulleys 551, 541 are coupled to each other in a torque-locking manner via a toothed belt 190. As a result, rotation of the transmission shaft 55, caused by rotation of the steering shaft 2, is converted into rotation of the housing 54 and the rotatable element 3 coupled to the housing 54. The housing 54 is mounted rotatably on the axis of rotation 45. A damping fluid 6 is arranged between the rotatable element 3 and the stationary element 4.

Figure 11:
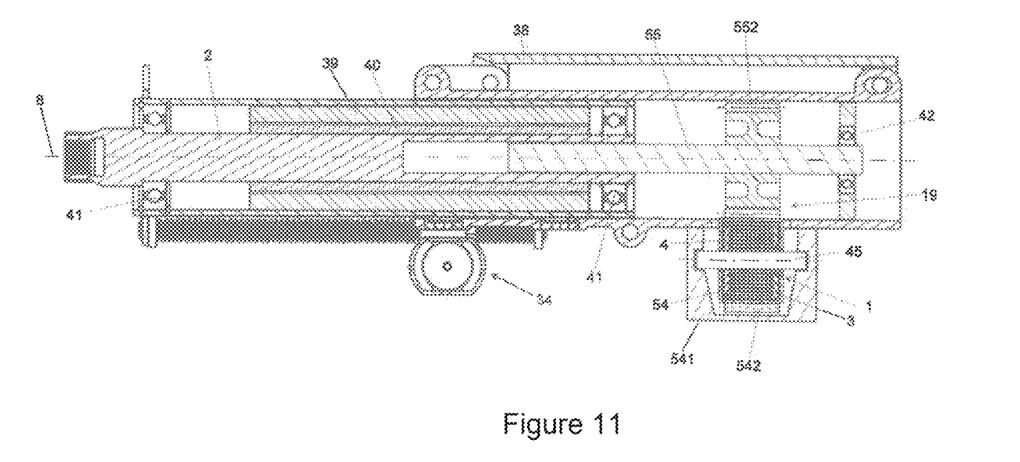
FIG. 11 is a cross section of a steering column in a further variant embodiment, wherein the damping device is coupled to the steering shaft with the interconnection of a gearing.

FIG. 11 shows an electric adjustable steering column analogously to the one illustrated in FIG. 10 with a gearing 19 which is changed in comparison to FIG. 10. Said gearing continues to be arranged between the steering shaft 2 or transmission shaft 55 and an embodiment according to the invention of the rotation damper 1. In the illustration shown, the gearing 19 is configured as a toothed gearing, preferably as a spur gearing. The transmission shaft 55 is coupled to a spur gear 552 in a torque-locking manner. The spur gear 552 has a toothing with a multiplicity of teeth. The housing 54 has a toothing on its outer circumference with a multiplicity of teeth for forming a further spur gear 542, wherein the spur gear 542 is in engagement with the spur gear 552. As a result, rotation of the transmission shaft 55, caused by rotation of the steering shaft 2, is converted into rotation of the housing 54 and of the rotatable element 3 coupled to the housing 54. The housing 54 is mounted rotatably on the axis of rotation 45. A damping fluid 6 is arranged between the rotatable element 3 and the stationary element 4. The axis of rotation 7 and the longitudinal axis 8 are oriented parallel to each other, wherein the longitudinal axis 8 and the axis of rotation 7 are at a distance greater than zero from each other.

What is claimed is:

1. A steering column for a motor vehicle, comprising:
a steering column tube,
a steering shaft rotatably mounted in the steering column tube about a longitudinal axis, and
a damping device comprising:
an element which is stationary in relation to the steering column tube, and
a rotatable element which is rotationally coupled to the steering shaft,
wherein the rotatable element is rotatable in relation to the stationary element about an axis of rotation,
wherein a damping fluid is arranged between the rotatable and the stationary element,
wherein the rotatable element comprises at least two surfaces, which are parallel to the axis of rotation, are in contact with the damping fluid, and are arranged so as to be spaced apart coaxially from one another, and wherein the rotatable element has two or more hollow cylinder elements which are arranged concentrically and are spaced apart from one another,
wherein a distance between the hollow cylinder elements from the stationary element to the rotatable element perpendicular to their longitudinal axis is unequal.

2. The steering column of claim 1 wherein the stationary element has two or more hollow cylinder elements which are arranged concentrically and are spaced apart from one another, wherein the respective hollow cylinder elements have diameters permitting a meshing movement of the respective hollow cylinder elements with one another.

3. The steering column of claim 2 wherein all of the hollow cylinder elements of the stationary element and all of the hollow cylinder elements of the rotatable element are configured so as to be connected to one another in each case at an axial end.

4. The steering column of claim 1 wherein the rotatable and the stationary elements have an identical effective axial length.

5. The steering column of claim 1 wherein the rotatable element and the stationary element surround the steering shaft.

6. The steering column of claim 1 wherein the damping fluid is silicone oil.

7. The steering column of claim 1 wherein a gearing is arranged between the steering shaft and the rotatable element.

8. A steering column for a motor vehicle, comprising:
a steering column tube,
a steering shaft rotatably mounted in the steering column tube about a longitudinal axis, and
a damping device comprising:
an element which is stationary in relation to the steering column tube, and
a rotatable element which is rotationally coupled to the steering shaft,
wherein the rotatable element is rotatable in relation to the stationary element about an axis of rotation,
wherein a damping fluid is arranged between the rotatable and the stationary element,
wherein the rotatable element comprises at least two surfaces, which are parallel to the axis of rotation, are in contact with the damping fluid, and are arranged so as to be spaced apart coaxially from one another, and wherein the rotatable element has two or more hollow cylinder elements which are arranged concentrically and are spaced apart from one another,
wherein a gearing is arranged between the steering shaft and the rotatable element.

* * * * *